No. 716,002. Patented Dec. 16, 1902.
W. P. DEVINE.
FASTENER.
(Application filed Oct. 15, 1900.)

(No Model.)

WITNESSES:
R. H. Hanney
G. W. Phillips.

INVENTOR:
W. P. Devine
by W. B. H. Downs
Atty.

THE NORRIS PETERS CO., PHOTO-LITHO., WASHINGTON, D. C.

UNITED STATES PATENT OFFICE.

WILLIAM P. DEVINE, OF BOSTON, MASSACHUSETTS, ASSIGNOR TO CONSOLIDATED FASTENER COMPANY, OF PORTLAND, MAINE.

FASTENER.

SPECIFICATION forming part of Letters Patent No. 716,002, dated December 16, 1902.

Application filed October 15, 1900. Serial No. 33,081. (No model.)

*To all whom it may concern:*

Be it known that I, WILLIAM P. DEVINE, a citizen of the United States, residing at Boston, in the county of Suffolk and Commonwealth of Massachusetts, have invented a new and useful Improvement in Fasteners, of which the following is a full specification.

This invention relates to the class of snap-fasteners wherein the members of the fastener pair are secured to material without the employment of an eyelet; and its object is to provide a fastener which shall be convenient to manufacture and efficient in operation.

Snap-fasteners consist of a resiliently-engaging pair whereof one or both of the members are made elastic, so that they can be sprung or snapped together and retain their engagement under normal condition. The quality of resiliency may be possessed by either or both members. The embodiment of my invention presently to be described is a snap-fastener wherein the stud member is elastic and the socket member relatively inelastic.

Figure 1:
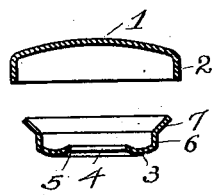
Figure 2:
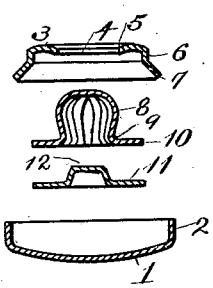
Figure 3:
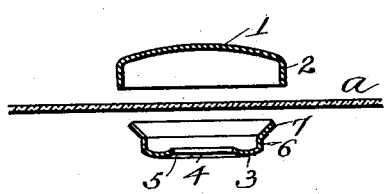
Figure 4:
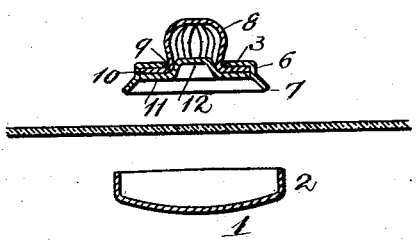
Figure 5:
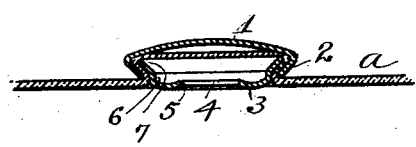
Figure 6:
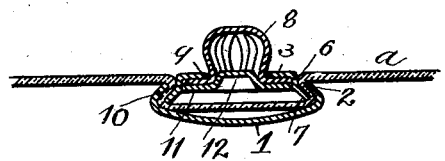

In the drawings, Figures 1, 3, and 5 illustrate a socket member of a snap-fastener embodying the features of my invention, and Figs. 2, 4, and 6 illustrate a spring-stud attached to material in the manner peculiar to my invention.

The stud member and socket member have in common this feature: Each comprises an attaching pair of plates which in their mode of engagement with each other and with the material are substantially alike. The two members or attaching pair constitute a complete socket when properly proportioned, and two similar members when used with the stud part constitute the means whereby the stud is secured to material. These attaching parts need not necessarily be identical in a given stud and socket; but as it will be convenient for the manufacturer to use the same parts for two different purposes it is preferable to make the two parts of the socket and the two attaching parts of the stud exactly the same. For this reason they are shown in the drawings as identical in shape and dimensions.

In Figs. 1, 3, and 5 the cap-piece and socket-piece of a socket member are shown in several stages of assembling, forming, and attaching to the material $a$. The cap-piece 1 is concave and flanged at 2. The socket-piece 3 is also concave, provided with a perforation 4, having an upturned edge 5, an annular wall 6, and spreading flange 7. The flange 7 is of such dimensions that it may be forced into the hollow of the cap 1, together with the material $a$. Then by a suitable tool or die the flange 2 is closed around the flange 7 and material $a$, binding the two parts of the socket firmly to each other and the material. The space within the socket-piece 3 is sufficient to form a chamber for the accommodation of a suitable stud. The upturned edge 5 of the perforation 4 assists materially in clasping the neck of a stud firmly and prevents undesirable looseness in the union of the stud and socket.

The stud member (shown in Figs. 2, 4, and 6) consists, primarily, of a stud 8 and an attaching pair 1 and 3. When, as in the instance now being described, a spring or "birdcage" stud is used, a stiffener-plate 11, with its dome 12, is employed to advantage in keeping the bars of the bird-cage from being accidentally crushed inward.

The attaching pair consists of plates 1 and 3, which for convenience in manufacture may be substantially the same in proportions and dimensions as the cap 1 and socket-piece 3. (Shown in Figs. 1, 3, and 5 and above described.)

In assembling the stud the stiffener-plate 11 is applied to the lower side of the stud 8, the plate 11 resting against the arms 10 of the bird-cage and the dome 12 filling the space between the bird-cage arms at the neck 9 of the stud. The attaching part 3, which for these purposes is a collar, is slipped or sprung over the head of the stud, fitting snugly around the neck 9. On the other side of the material $a$ the attaching-plate 1 is applied, as shown in Fig. 4. The collar-plate 3, with its flange 7, is pressed into the space inside the flange 2, with the material $a$ between the two attaching-plates. Then by means of a tool or die the flange 2 is closed around the flange 7 and material $a$.

By providing the socket-piece 3 with an annular wall or upturned portion 6 between the spreading flange and the base-flange there is not only formed a structure of a size to permit of the placing of the parts 8 and 11, but in its use in connection with the socket member said wall or flange is of advantage in that it forms a strengthening part for the spreading flange during the operation of securing the two parts to the material. In such operation owing to the annular pressure applied to cause the flange 2 of the cap-piece to be closed around the material there is a tendency of an inward movement of the flange 7, which movement is resisted by said flange aided by the annular wall 6.

The cylindrical annular portion 6 of the collar-plate 3 and the stiffener-plate 11 fit closely together, the slight contraction of the collar-piece under the pressure communicated through the material $a$ when the flange 2 is closed giving the plate 11 an additional grip.

For purposes of attaching the stud it is not necessary that the attaching parts should have the depth required for performing the functions of a socket member; but the economy in manufacture is a recommendation to make the two parts of the socket member serve also as attaching parts for the stud.

What I claim, and desire to secure by Letters Patent of the United States, is—

1. A stud member for a snap-fastener, comprising a stud flanged at its base, a socket-piece having a central opening through which the stud projects and is held and formed with a flaring annular flange, and an opposite attaching-plate formed with a vertical annular flange into which the flange of the socket-piece is seated with the material; the flanges of said socket-piece and attaching-plate being clenched together with the material imperforate between them, substantially as described.

2. In a stud member for a snap-fastener, the combination of a bird-cage spring stud having a horizontal base-flange, a stiffener-plate therefor adapted to set under and against the base-flange of the stud, and attaching-plates, one having a collar adapted to surround the spring-stud at its base, the other having a flange adapted to embrace the first-named attaching-plate and the material whereto the parts are attached, substantially as described.

3. In a snap-fastener, a socket member comprising a concave cap and a concave socket-piece or attaching-plate having a flaring flange and upturned edge, said cap and socket-piece adapted to engage peripherally with each other and with the imperforate garment material between them, and a stud member comprising a stud-piece having a base-flange, a stiffener-plate having a flange applied to the lower side of the base of the stud-piece, and an attaching-plate and a cap, said attaching-plate and cap being of a form similar to that of the socket member, substantially as described.

4. In a snap-fastener, the combination of a stud-piece provided with a head, a neck and a base-flange, an attaching-plate adapted to be sprung over said head and provided with an annular wall and flaring flange, a concave cap having a flange adapted to engage the flange of the attaching-plate with imperforate garment material between them, and a socket member comprising the attaching-plate and cap attached to the imperforate material by engagement of their flanges, substantially as described.

5. A stud member, comprising a stud-piece flanged at its base, an attaching-plate having a central opening through which the head of the stud-piece projects, and a flaring flange, a stiffener-plate within the stud-piece, and a flanged attaching-plate adapted to engage the flange of the first-named attaching-plate with the imperforate garment material between them, said attaching-plates designed to be used to form a socket member when attached with the imperforate garment material between them, substantially as described.

In testimony whereof I have signed my name to this specification, in the presence of two subscribing witnesses, on this 7th day of September, A. D. 1900.

WILLIAM P. DEVINE.

Witnesses:
A. H. FLANNERY,
GEO. A. HOLMES.